(12) United States Patent
Kato et al.

(10) Patent No.: US 12,345,933 B2
(45) Date of Patent: Jul. 1, 2025

(54) OPTICAL DEVICE AND OPTICAL TRANSMISSION APPARATUS USING SAME

(71) Applicant: SUMITOMO OSAKA CEMENT CO., LTD., Tokyo (JP)

(72) Inventors: Kei Kato, Tokyo (JP); Hideki Ichimei, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 206 days.

(21) Appl. No.: 18/126,904

(22) Filed: Mar. 27, 2023

(65) Prior Publication Data

US 2023/0314737 A1 Oct. 5, 2023

(30) Foreign Application Priority Data

Mar. 30, 2022 (JP) .................................. 2022-056209

(51) Int. Cl.
*H04B 10/00* (2013.01)
*G02B 6/42* (2006.01)

(52) U.S. Cl.
CPC .................. *G02B 6/4256* (2013.01)

(58) Field of Classification Search
CPC .. G02B 6/4256; G02B 6/4246; G02B 6/4257; G02B 6/421; G02B 6/4262; G02B 6/428
See application file for complete search history.

(56) References Cited

U.S. PATENT DOCUMENTS

| | | | | |
|---|---|---|---|---|
| 9,651,804 B2 * | 5/2017 | Sugiyama | ............. | G02B 6/4215 |
| 10,268,057 B2 * | 4/2019 | Katou | ...................... | G02F 1/225 |
| 10,348,007 B2 * | 7/2019 | Kataoka | ............... | G02B 6/4279 |
| 11,347,126 B2 * | 5/2022 | Saeki | ....................... | G02F 1/025 |
| 2005/0213882 A1 * | 9/2005 | Go | ....................... | H01S 5/02216 385/37 |
| 2012/0051683 A1 * | 3/2012 | Sugiyama | ............... | G02F 1/035 385/1 |
| 2016/0028489 A1 * | 1/2016 | Saeki | ................... | G02B 6/4206 398/79 |
| 2018/0088361 A1 * | 3/2018 | Sugamata | ............. | G02F 1/0327 |
| 2018/0180908 A1 * | 6/2018 | Katou | ..................... | G02F 1/225 |
| 2018/0231866 A1 * | 8/2018 | Sugamata | ............. | G02F 1/2255 |
| 2018/0287274 A1 * | 10/2018 | Kataoka | ............... | G02B 6/4279 |
| 2021/0055623 A1 | 2/2021 | Saeki | | |
| 2022/0344289 A1 * | 10/2022 | Tanobe | ................... | H01L 23/057 |
| 2022/0375766 A1 * | 11/2022 | Tanobe | ................... | H01P 3/026 |
| 2022/0384285 A1 * | 12/2022 | Tanobe | ................... | H01L 21/52 |

(Continued)

FOREIGN PATENT DOCUMENTS

JP 2021-509483 A 3/2021

*Primary Examiner* — Agustin Bello

(74) *Attorney, Agent, or Firm* — IpHorgan Ltd.

(57) ABSTRACT

An optical device includes a housing that accommodates at least an optical waveguide element, a main body portion 1 of the housing having an opening portion OP on one surface and a lead pin PN1 fixed to a side surface adjacent to the one surface, and including a metal member 2 disposed to surround the opening portion OP and a lid member 11 that closes the opening portion OP and is joined to the metal member 2, in which end portions of the metal member 2 and the lid member 11 along the side surface of the main body portion 1 at which the lead pin PN1 is disposed are located on an inner side of the main body portion 1 than the side surface of the main body portion 1.

7 Claims, 6 Drawing Sheets

(56) References Cited

U.S. PATENT DOCUMENTS

2022/0404563 A1\* 12/2022 Liu .................. H01S 5/0233
2023/0059013 A1\* 2/2023 Hata .................. G02B 6/42
2023/0314737 A1\* 10/2023 Kato ................ G02B 6/4256
                                                              385/92

\* cited by examiner

OPTICAL DEVICE AND OPTICAL TRANSMISSION APPARATUS USING SAME

CROSS-REFERENCE TO RELATED APPLICATIONS

This application claims the benefit of Japanese Patent Application No. 2022-056209 filed Mar. 30, 2022, the disclosure of which is herein incorporated by reference in its entirety.

BACKGROUND OF THE INVENTION

Field of the Invention

The present invention relates to an optical device and an optical transmission apparatus using the optical device, and more particularly to an optical device including a housing that accommodates at least an optical waveguide element.

Description of Related Art

In the fields of optical communication and optical measurement, an optical device such as an optical modulator using an optical waveguide element having an optical waveguide and a modulation electrode of modulating light waves propagating through the optical waveguide is widely used. An optical device such as a driver-integrated modulator in which an optical waveguide element or an optical component of inputting and outputting light waves to the optical waveguide element, and further an electronic component such as a driver IC of amplifying a modulation signal to be input to the optical waveguide element, as described in PCT Japanese Translation Patent Publication No. 2021-509483, are accommodated into one housing is put to practical use.

FIG. 1 illustrates a plan view of an optical device, and FIG. 2 illustrates a cross-sectional diagram taken along a dashed-dotted line A-A' in FIG. 1. As illustrated in FIG. 1, a housing of the optical device has a main body portion 1 configured with ceramic or a plurality of metals (kovar, copper-tungsten, and the like), and one surface of the main body portion 1 has an opening portion OP for mounting a component such as an optical waveguide element.

A metal member 2 (such as Kovar) for fixing a lid for hermetic-sealing by seam welding or the like is disposed on the surface of the main body portion 1 at which the opening portion OP is located. In a case where ceramic is used for the main body portion 1, since it is not possible to directly seam-weld ceramic and a lid member made of metal, the metal member 2 such as Kovar is joined to the ceramic main body portion 1 in advance with a brazing material such as AuSn. After that, the metal member 2 and a lid member 11 are seam-welded. In addition, lead pins (PN1 and PN2) for electrically connecting and relaying an inside and an outside of the housing are arranged at one or a plurality of side surfaces of the housing.

FIG. 2 is a cross-sectional diagram of FIG. 1, and particularly illustrates a cross-sectional diagram of the optical device hermetically sealed by the lid member 11 and mounted on a printed substrate 3. FIG. 1 does not illustrate the lid member or the printed substrate, and in FIG. 2, the opening portion OP of FIG. 1 opens in a downward direction in FIG. 2. Inside the housing, a component 4 such as a driver IC or an optical waveguide element is disposed and fixed at a pedestal part (or accommodating portion) 101 provided on a bottom surface portion 10 of the housing, made of metal. In an optical device such as a high bandwidth-coherent driver modulator (HB-CDM) in which a driver IC and an optical waveguide element are integrated in the same housing, the opening portion OP disposed to face downward, as illustrated in FIG. 2. This is for dissipating heat generated by the driver IC from the bottom surface portion 10 side, and a heat dissipation mechanism such as a heat sink is disposed on a back side of the bottom surface portion 10 (upper side in FIG. 2). The optical device is mounted such that the lid member 11 that hermetically seals the opening portion OP of the main body portion 1 and the printed substrate 3 are in contact with each other.

Tip portions of the lead pins (PN1 and PN2) fixed to one side surface of the housing (main body portion 1) are soldered to a soldering pattern on the printed substrate 3 to electrically connect the optical device and the printed substrate.

In an optical transmission apparatus, the optical device is disposed on the printed substrate, and another component such as signal processing means such as a digital signal processing circuit or a light source for generating a light wave to be input to the optical waveguide element is also disposed around the optical device.

As illustrated in FIG. 2, in a case where the lid member 11 of the housing is disposed so as to be in contact with the printed substrate 3, the housing, particularly the lid member 11, is electrically grounded, and solder for connecting the lead pin PN1 to the printed substrate may reach the lid member 11 or the metal member 2 and cause an electrical short-circuit. In order to avoid this, it is necessary to make a distance S0 between a contact portion of the lead pin PN1 with the printed substrate 3 and a side surface (end portion of the lid member 11) of the main body portion 1 of the housing sufficiently large, for example, 1 mm or higher, in FIG. 2. Meanwhile, the presence of the contact portion of the lead pin away from the main body portion 1 of the housing increases a space for disposing the optical device, making it difficult to reduce a component mounting space on the printed substrate. In particular, in recent years, there is a demand for the integration of the optical device into an ultra-compact transceiver module such as a QSFP system (QSFP+, QSFP28, QSFP-DD, or the like) or an SFP system (SFP+, SFP28, SFP-DD, or the like), so that even a slight reduction in mounting space poses a big problem.

SUMMARY OF THE INVENTION

An object of the present invention for solving the problems described above is to provide an optical device and an optical transmission apparatus using the optical device, capable of suppressing an electrical short-circuit between a lead pin disposed on a side surface of a housing and a lid member, and being miniaturized.

In order to solve the problems described above, an optical device and an optical transmission apparatus according to the present invention have the following technical features.

(1) According to the present invention, there is provided an optical device including: a housing that accommodates at least an optical waveguide element, a main body portion of the housing including an opening portion at one surface of the main body portion, and having a lead pin fixed to a side surface adjacent to the one surface; a metal member disposed to surround the opening portion; and a lid member that closes the opening portion and is joined to the metal member, in which end portions of the metal member and the lid member along the side surface of the main body portion at which the lead pin is disposed are located on an inner side of the main body portion with respect to the side surface of the main body portion.

(2) In the optical device according to (1), a distance from the side surface of the main body portion to the end portion of the metal member may be equal to or higher than 0.5 mm.

(3) In the optical device according to (1), a notch may be provided on an outer side of the main body portion at an end surface of the main body portion in contact with the metal member.

(4) In the optical device according to (1), a protuberant portion protruding inward from the main body portion may be formed at an end surface of the main body portion.

(5) In the optical device according to (1), a notch may be provided on the inner side of the main body portion at an end surface of the main body portion in contact with the metal member, and the metal member may be disposed to be in contact with an inner surface of the notch.

(6) In the optical device according to (1), a driver circuit element that generates an electrical signal to be applied to a modulation electrode inside the optical waveguide element may be disposed adjacent to the optical waveguide element.

(7) According to the present invention, there is provided an optical transmission apparatus including: the optical device according to (6); and a signal generator that generates a modulation signal to be input to the driver circuit element.

The present invention provides an optical device including: a housing that accommodates at least an optical waveguide element, a main body portion of the housing including an opening portion at one surface of the main body portion, and having a lead pin fixed to a side surface adjacent to the one surface; a metal member disposed to surround the opening portion; and a lid member that closes the opening portion and is joined to the metal member, in which end portions of the metal member and the lid member along the side surface of the main body portion at which the lead pin is disposed are located on an inner side of the main body portion with respect to the side surface of the main body portion. Therefore, it is possible to secure a wider clearance between the lead pin, and the metal member and the lid member, and it is possible to prevent a defect such as an electrical short-circuit between the lead pin and the lid member or the metal member due to solder or the like. In addition, by reducing the protruding amount of the lead pin from the side surface of the main body portion of the housing, it is possible to reduce a space occupied by the optical device and it is also possible to contribute to miniaturization.

DETAILED DESCRIPTION OF THE INVENTION

Hereinafter, the present invention will be described in detail by using appropriate examples.

As illustrated in FIGS. 3 to 11, the present invention relates to an optical device including a housing that accommodates at least an optical waveguide element, the main body portion 1 of the housing having the opening portion OP on one surface and the lead pin PN1 fixed to a side surface adjacent to the one surface, and including the metal member 2 disposed to surround the opening portion OP and the lid member 11 that closes the opening portion OP and is joined to the metal member 2, in which end portions of the metal member 2 and the lid member 11 along the side surface of the main body portion 1 at which the lead pin PN1 is disposed are located inside the main body portion 1 than the side surface of the main body portion 1.

Metals such as SUS304, Kovar, and CuW are used as materials for the housing, and the housing main body can be formed not only by cutting work on a single metal material integrally, but also by combining a plurality of members manufactured by cutting work, pressing work, or the like to form one housing. It is also possible to use a ceramic material for the main body portion 1 of the housing (meaning the body portion including at least the side surfaces of the housing).

In a case where the ceramic material is used for the main body portion 1, the metal member 2 is joined to the main body portion 1 by using a brazing material such as AuSn in order to enable joining with the lid member 11 made of metal.

The metal member 2 and the lid member 11 are joined by seam welding or laser welding to hermetically seal the inside of the housing.

Figure 1:
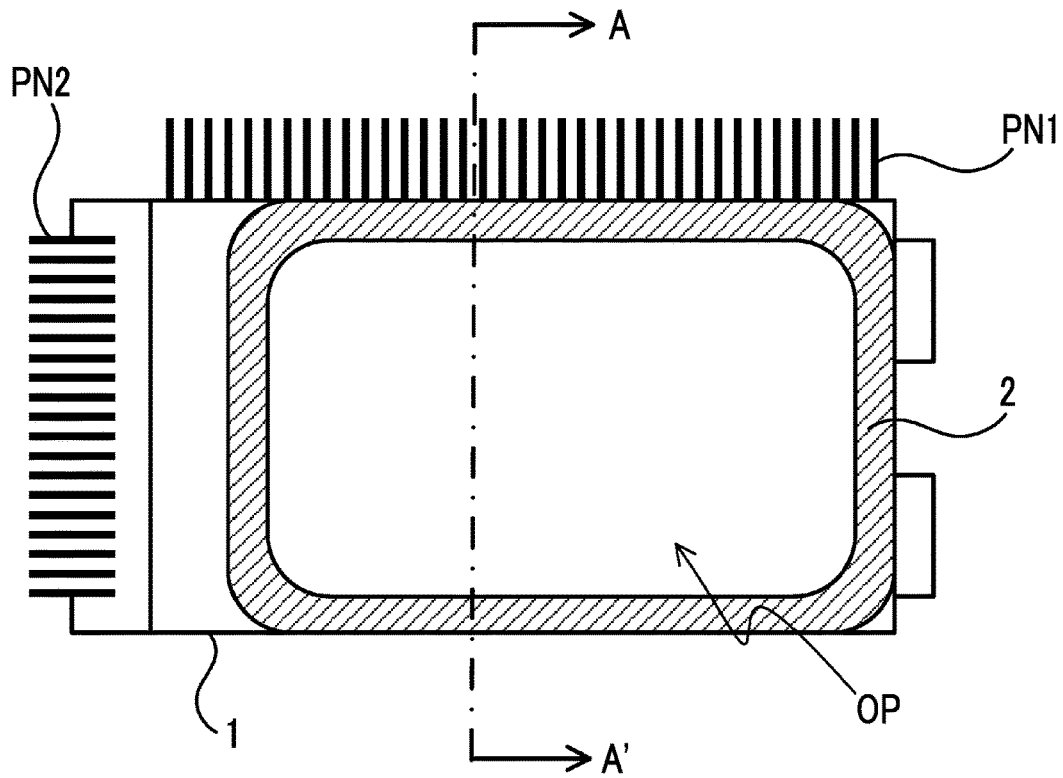
FIG. 1 is a plan view of a housing designed for an optical device in the related art, as viewed from an opening portion side.
Figure 2:
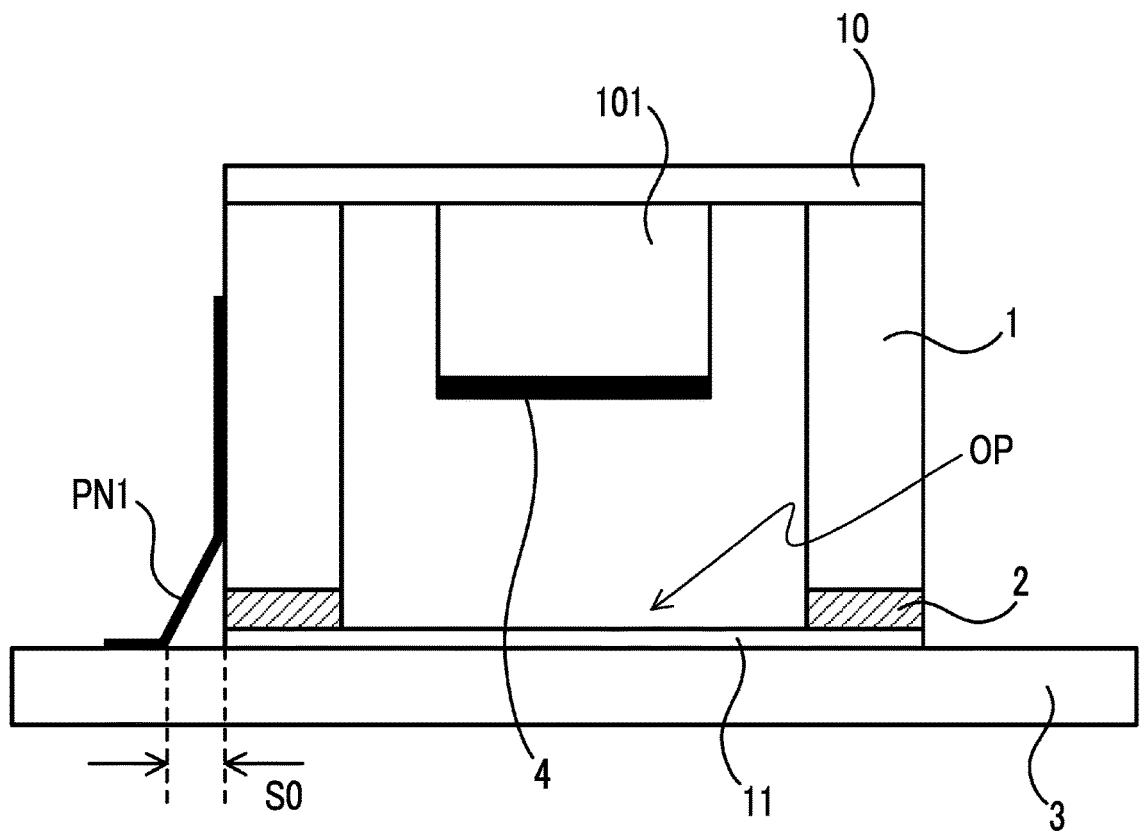
FIG. 2 is a cross-sectional diagram taken along a dashed-dotted line in FIG. 1, and illustrates a mode in which the optical device is disposed on a printed substrate.
Figure 3:
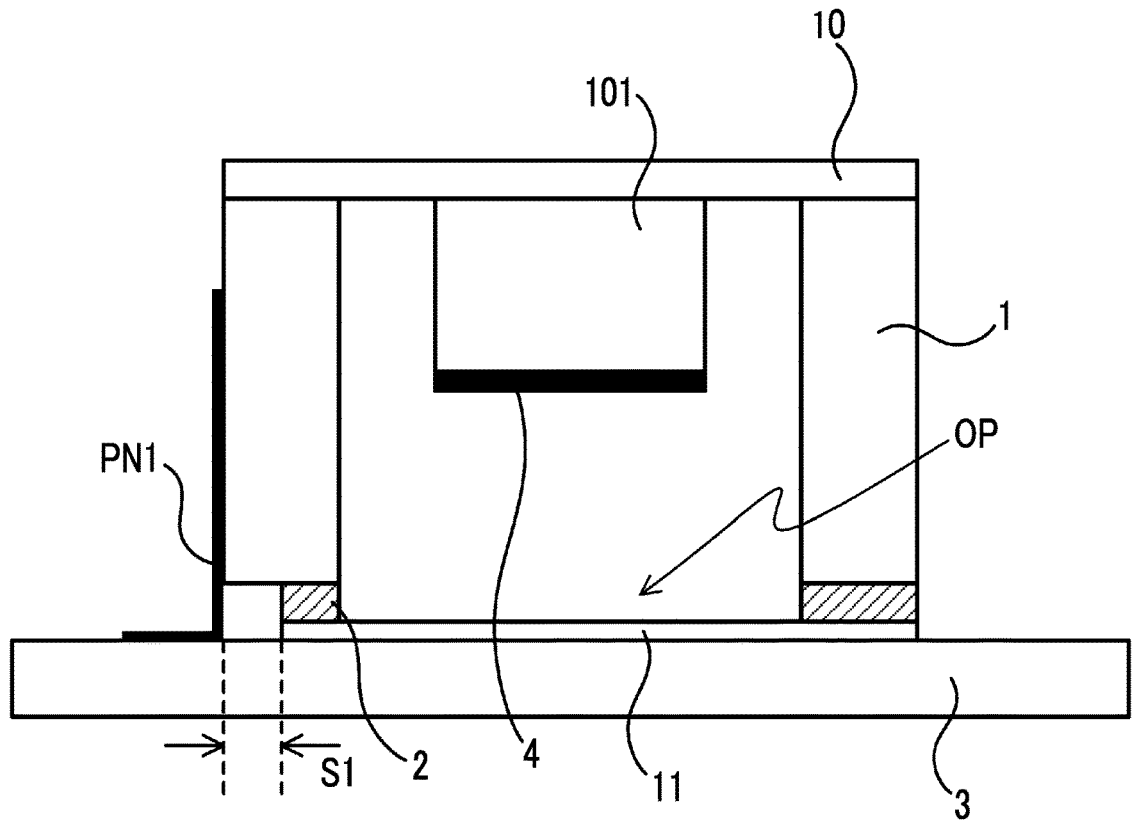
FIG. 3 is a cross-sectional diagram illustrating a first embodiment of an optical device according to the present invention.

In the same manner as FIG. 2, in FIG. 3, a reference numeral 4 indicates a component such as an optical waveguide element or a driver IC to be arranged in the housing, and a reference numeral 101 indicates a portion that holds the component 4 at the bottom surface portion 10 of the housing.

Figure 4:
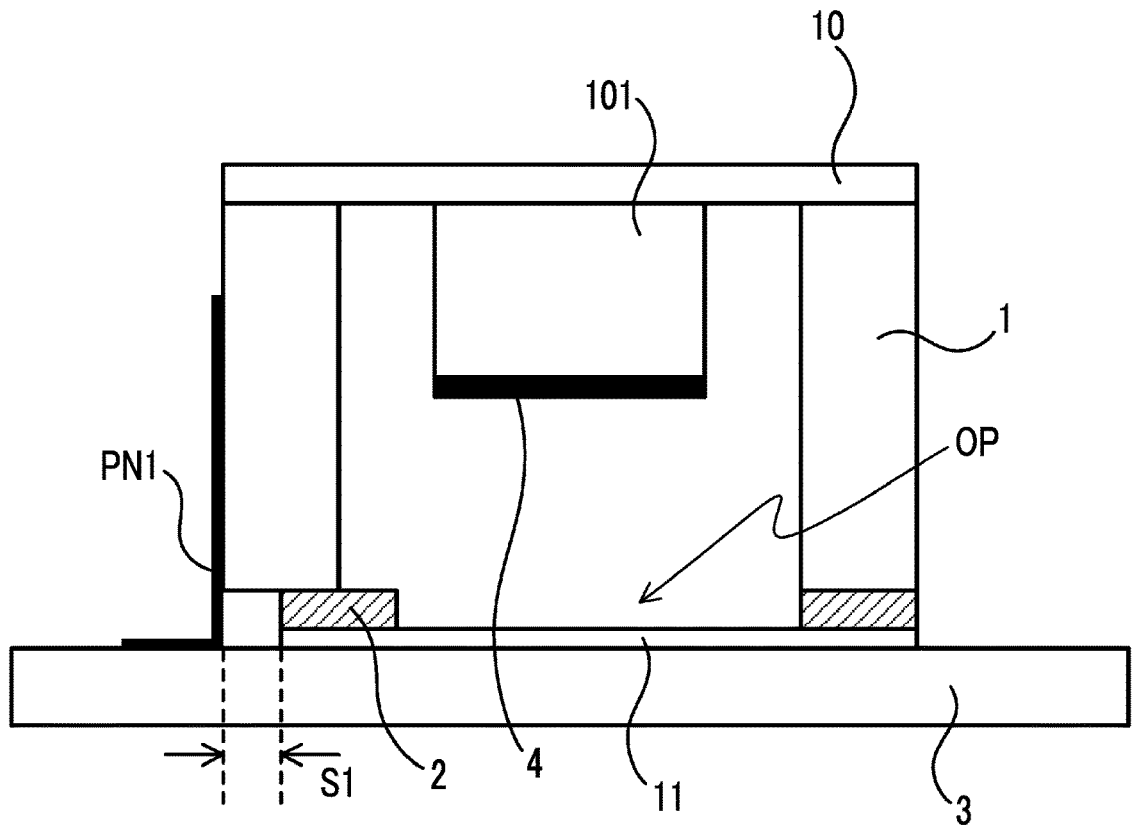
FIG. 4 is a cross-sectional diagram illustrating an example in which a part of FIG. 3 is deformed.

A feature of the optical device according to the present invention is that, as illustrated in FIG. 3, the end portions of the metal member 2 and the lid member 11 enter the inside of the housing from the side surface of the main body portion 1 of the housing. In FIG. 3, since the lead pin PN1 extends parallel to the side surface of the main body portion 1, a distance S1 between a contact portion between the lead pin and the printed substrate and the end portions of the metal member 2 and the lid member 11 is equal to a distance from the side surface of the main body portion 1 to the end portion of the lid member 11 or the like. In FIG. 3, a width (a length in the rightward-leftward direction of FIG. 3) of the metal member 2 disposed at a portion at which the lid member 11 is retracted from the side surface of the main body portion 1 is configured to be shortened. The present invention is not limited to this, and as illustrated in FIG. 4, it is also possible to set the width of the metal member 2 to the same width as a width of the non-retracted side (shaded portion on the right side of FIG. 4) and the metal member 2 can be disposed to protrude into the housing.

By ensuring that the distance from the side surface of the main body portion to the end portion of the metal member (corresponding to S1 in FIG. 3) is equal to or higher than 0.5 mm, when the lead pin is connected to the printed substrate by soldering or the like, it is possible to effectively suppress an electrical short-circuit between the lead pin and the lid member 11 (metal member 2).

As illustrated in FIG. 3, the end portion of the metal member 2 is located inside the main body portion 1 (close to a center of the housing) than the side surface of the main body portion 1 of the housing at which the lead pin is disposed. As a result, a clearance is formed under a wall surface of the housing at which the lead pin is disposed, and it is possible to suppress solder or the like from contacting the main body portion 1.

In the optical device according to the present invention, a clearance is formed on a side of the metal member 2 (lid member 11) at which the lead pin PN1 is disposed, so that a cross-sectional shape of the metal member 2 illustrated in FIG. 3 may have different widths on the lead pin side and the opposite side. Such a state is called an asymmetric state of the metal member.

As illustrated in FIG. 3, a shape of the lead pin PN1 can be "L-shaped". As a result, a distance from the side surface of the main body portion 1 of the housing to a tip of the lead pin can be made shorter than in the related art, and a space for arranging the optical device can be reduced. As a result, a mounting space on the printed substrate can be expanded. For example, when comparing FIGS. 2 and 3, it is possible to reduce the mounting space occupied by S0×"length of a range in which a plurality of lead pins are arranged in parallel". A soldering pattern on the printed substrate can be disposed at a position closer to the housing than in the related art, and the component mounting space on the printed substrate can be expanded.

Figure 5:
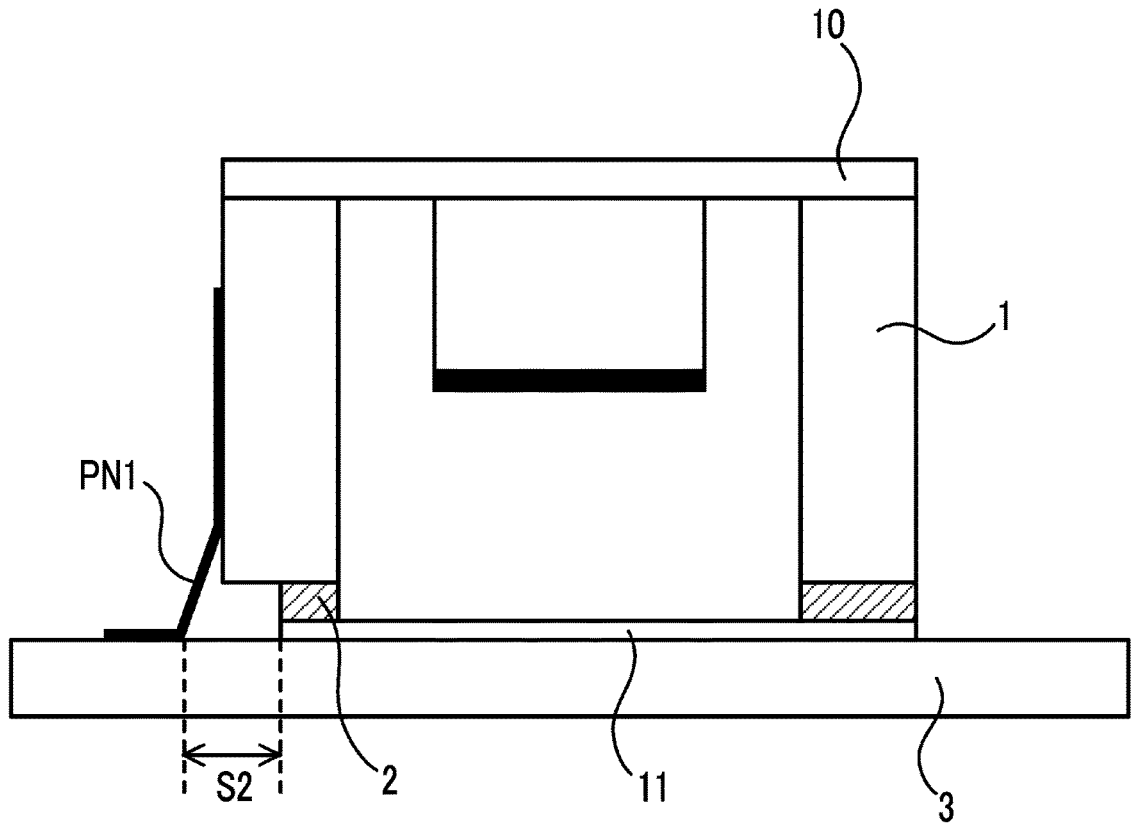
FIG. 5 is a cross-sectional diagram illustrating a second embodiment of the optical device according to the present invention.

Even if the shape of the lead pin is not L-shaped, but a shape in the related art in which a contact portion of a lead pin and a printed substrate is located outside a side surface of a housing as illustrated in FIG. 5, it is sufficient to secure the distance S2 of approximately 1 mm, so that the distance from the side surface of the housing to the tip of the lead pin can be made shorter than in the related art.

Figure 6:
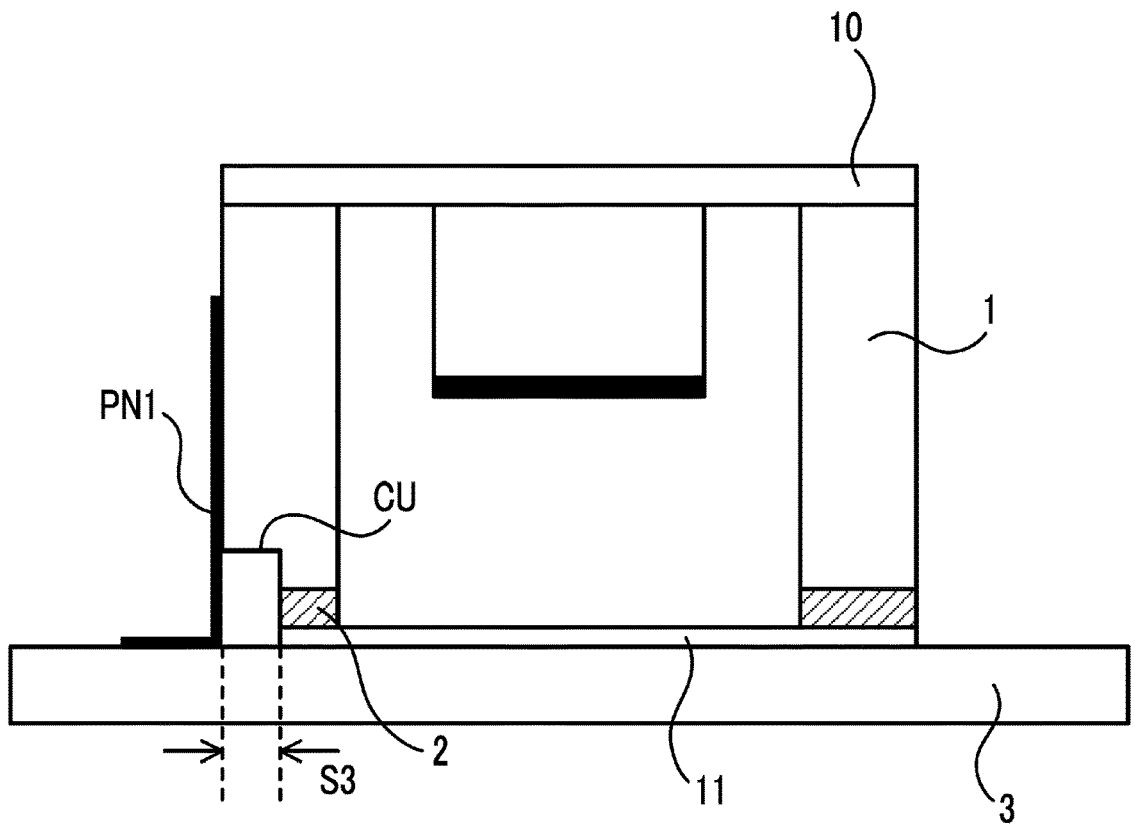
FIG. 6 is a cross-sectional diagram illustrating a third embodiment of the optical device according to the present invention.
Figure 9:
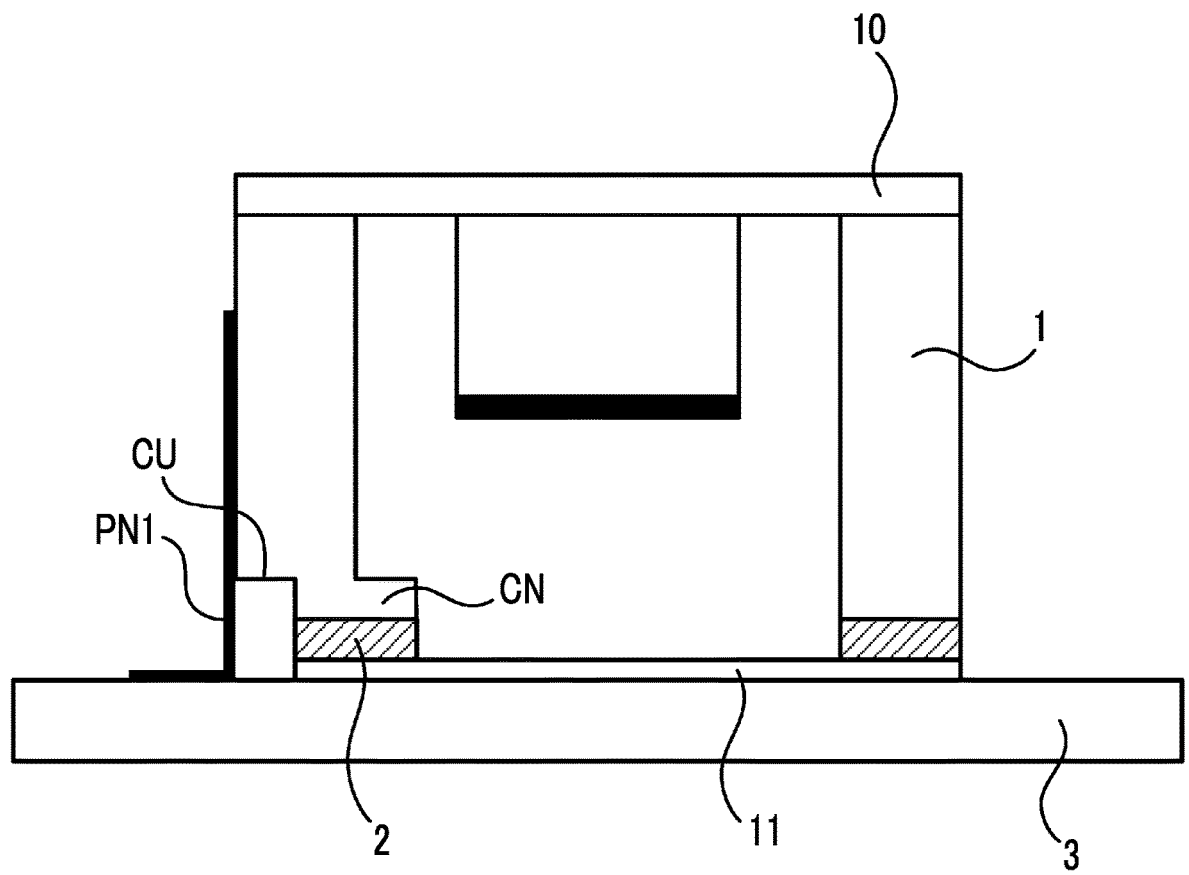
FIG. 9 is a cross-sectional diagram illustrating a fifth embodiment of the optical device according to the present invention.

Further, as illustrated in FIG. 6 or FIG. 9, a notch CU can be provided on an outer side of the main body portion 1 of the housing at an end surface of the main body portion 1, which is in contact with the metal member 2.

Figure 8A:
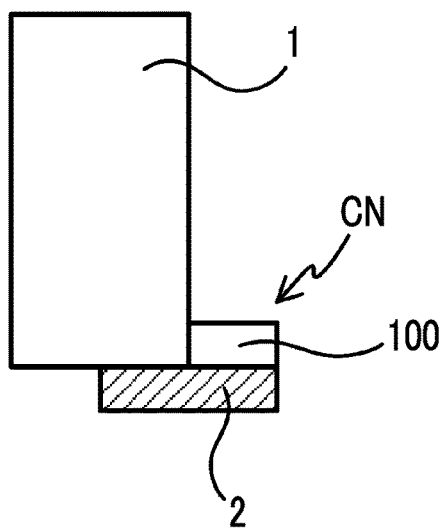
FIG. 8A is a diagram describing a configuration of a protuberant portion CN illustrated in FIG. 6.
Figure 8B:
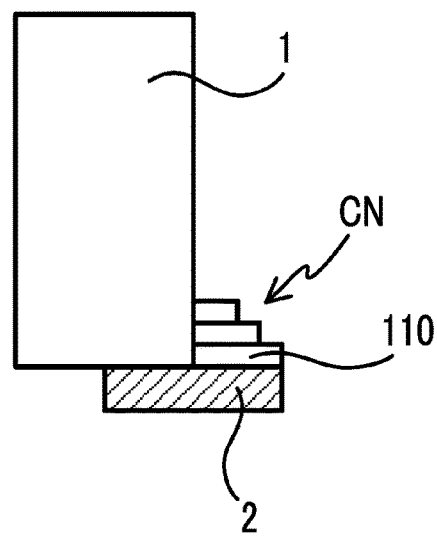
FIG. 8B is another diagram describing the configuration of the protuberant portion CN illustrated in FIG. 6.

This is because the metal member 2 has a thin thickness of approximately 0.5 mm to 1 mm, so a clearance S3 formed at a lower portion of the wall surface of the housing may be narrow. By adopting a configuration having the notched portion CU as illustrated in FIG. 5 or FIGS. 8A and 8B, it is possible to increase a height of the clearance and reduce an occurrence risk of a short-circuit failure due to soldering.

Figure 7:
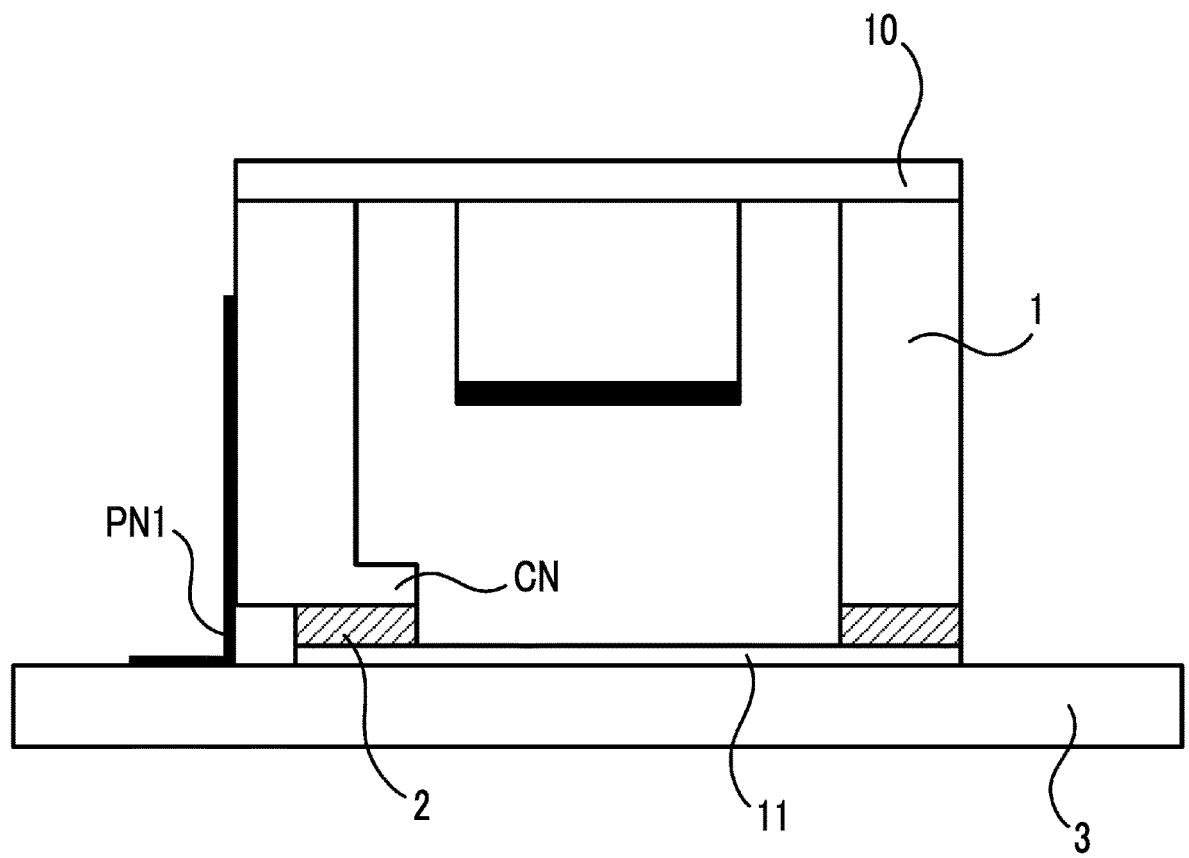
FIG. 7 is a cross-sectional diagram illustrating a fourth embodiment of the optical device according to the present invention.

In addition, as illustrated in FIG. 7 or FIG. 9, a protuberant portion CN protruding inward from the main body portion 1 can be formed on the end surface of the main body portion 1, to which the metal material 2 is joined.

As illustrated in FIG. 7, the end portion of the metal member 2 is located inside the main body portion 1 (closer to the center of the housing) than the side surface of the main body portion 1 of the housing at which the lead pin is disposed, and an other side surface of the metal member 2 overhangs inside the housing. The protuberant portion CN protruding inward is formed on an inner surface side of the side wall of the main body portion 1 so as to be joined to the overhanging metal member 2. As illustrated in FIGS. 8A and 8B or FIGS. 10A and 10B, a shape of the protuberant portion CN may be formed with a protuberant part 100 having a uniform width (a), or formed with a laminated body of protuberant parts 110 having different widths (b).

The optical device to which the present invention is applied is significantly small, for example, approximately 40 mm or lower in length, 15 mm or lower in width, and 6 mm or lower in height. In such a housing, the wall surface of the housing to which the lead pin is fixed is as significantly thin as approximately 1 mm. Moreover, depending on the number of components and a size of the component to be mounted inside the housing, a thickness of the wall surface may become even thinner. If a position of the metal member 2 is disposed inside the housing than the side surface of the housing while maintaining the thickness of the wall surface of the housing, a joint area between the main body portion 1 of the housing and the metal member 2 becomes smaller, and there is also a problem that a joint strength between the components is lowered. The joint strength between the components can be improved by providing the protuberant portion CN inside the housing and increasing the joint area with the metal member 2.

Figure 10A:
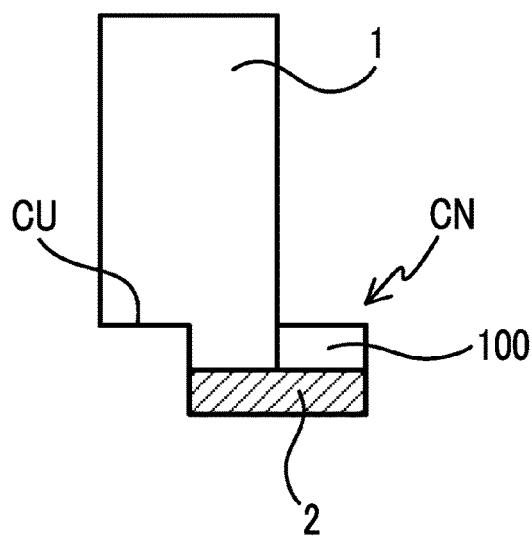
FIG. 10A is a diagram describing a configuration of the protuberant portion CN illustrated in FIGS. 8A and 8B.
Figure 10B:
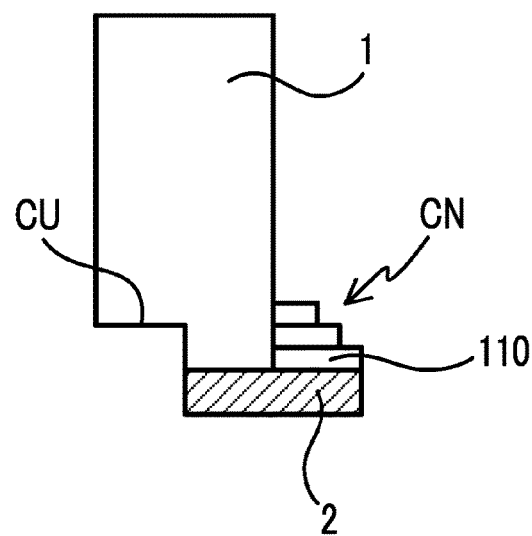
FIG. 10B is another diagram describing the configuration of the protuberant portion CN illustrated in FIGS. 8A and 8B.

In FIG. 9, both the effect of the notch CU described in FIG. 6 and the effect of the protuberant portion CN described in FIG. 7 can be obtained. FIGS. 10A and 10B illustrate the shape of the protuberant portion CN provided in FIG. 9.

Figure 11:
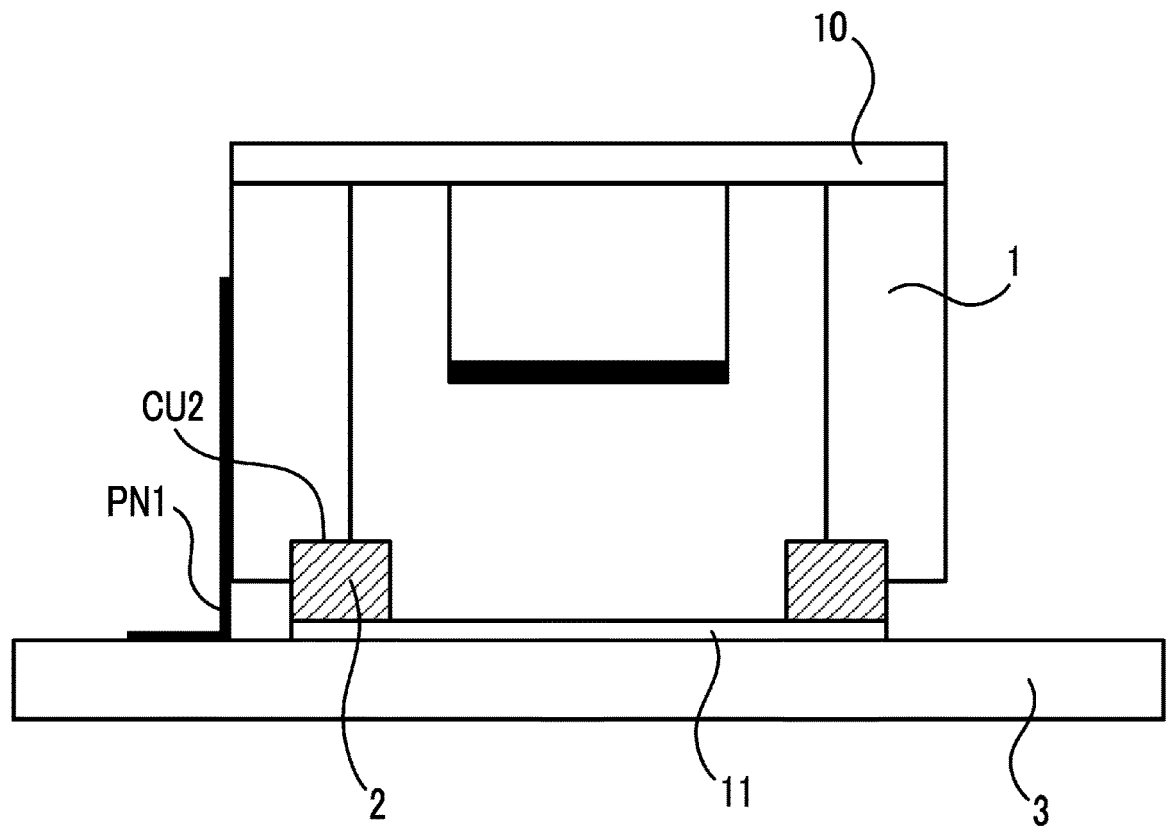
FIG. 11 is a cross-sectional diagram illustrating a sixth embodiment of the optical device according to the present invention.

As a method of increasing the joint strength between the main body portion 1 of the housing and the metal member 2, as illustrated in FIG. 11, a notch (CU2) is provided at the end surface of the main body portion 1, which is in contact with the metal member 2, and the metal member 2 is disposed to be in contact with an inner surface of the notch.

In FIG. 9, left and right cross-sections of the metal member 2 are the same, and the left and right cross-sections can have an asymmetrical state. For example, it is possible to change the width or thickness of the metal member 2 on the left and right, or to provide the notch CU2 only on a side surface at which the lead pin is disposed, and leave an other side surface unchanged.

By adopting the configuration illustrated in FIG. 11, it is possible to join the main body portion 1 and the metal member 2 of the housing on two surfaces, and it is possible to increase the joint area between the components, that is, the joint strength, without providing the protuberant portion CN as illustrated in FIG. 7 inside the housing. Since the structure of the housing is also simplified, a manufacturing cost of the housing can be reduced.

Figure 12:
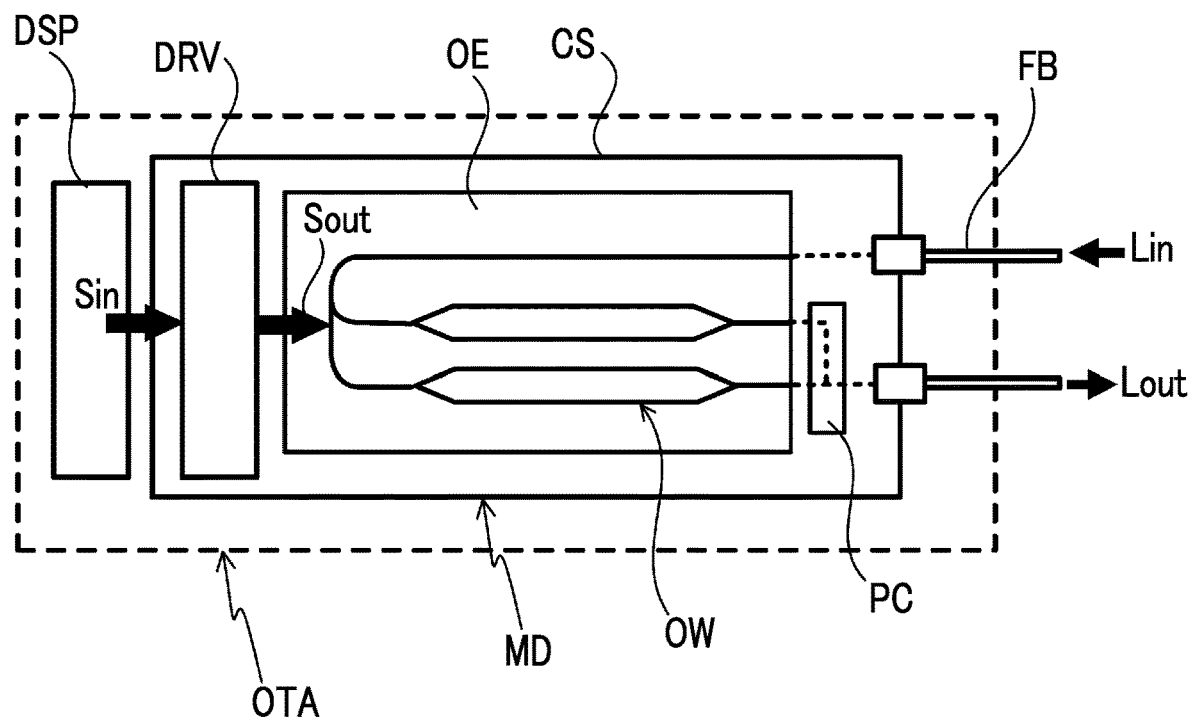
FIG. 12 is a diagram illustrating an optical transmission apparatus according to the present invention.

FIG. 12 is a diagram illustrating an example of an optical transmission apparatus. The housing structure of the optical device, which is a feature of the present invention, can be applied to a housing CS of FIG. 12.

In the optical device, a driver circuit element DRV that generates an electrical signal Sout to be applied to a modulation electrode of the optical waveguide element is disposed adjacent to an optical waveguide element OE, and the optical waveguide element OE and the driver circuit element DRV are accommodated in the same housing CS. In the optical waveguide element OE, by using an optical fiber FB, input light Lin is input to an optical waveguide OW formed in the optical waveguide element via an optical component such as a lens. On the other hand, light waves output from the optical waveguide element OE are synthesized through, for example, polarization combining means PC, and input to another optical fiber via an optical component such as a lens to become output light Lout.

Further, a signal generator DSP (digital signal processing apparatus) that generates a modulation signal Sin to be input to the driver circuit element DRV can be provided to be included in the optical transmission apparatus. It is also possible to incorporate the housing CS and the signal generator DSP into one chassis.

INDUSTRIAL APPLICABILITY

As described above, according to the present invention, it is possible to provide an optical device that can be miniaturized by suppressing an electrical short-circuit between a lead pin arranged at a side surface of a housing and a lid member, and an optical transmission apparatus using the optical device.

What is claimed is:

1. An optical device comprising:
a housing that accommodates at least an optical waveguide element, a main body portion of the housing including an opening portion at one surface of the main body portion, and having a lead pin fixed to a side surface adjacent to the one surface;
a metal member disposed to surround the opening portion; and
a lid member that closes the opening portion and is joined to the metal member,
wherein the lead pin extends along the side surface toward the lid, and is bent outward at the lid position, and
the outer side of the end portions of the metal member and the lid member along the side surface of the main body portion at which the lead pin is disposed are located on an inner side of the main body portion with respect to the side surface of the main body portion.

2. The optical device according to claim 1,
wherein a distance from the side surface of the main body portion to the outer side of the end portion of the metal member is equal to or higher than 0.5 mm.

3. The optical device according to claim 1,
wherein a notch is provided on an outer side of the main body portion at an end surface of the main body portion in contact with the metal member.

4. The optical device according to claim 1,
wherein a protuberant portion protruding inward from the main body portion is formed at an end surface of the main body portion.

5. The optical device according to claim 1,
wherein a notch is provided on the inner side of the main body portion at an end surface of the main body portion in contact with the metal member, and the metal member is disposed to be in contact with an inner surface of the notch.

6. The optical device according to claim 1,
wherein a driver circuit element that generates an electrical signal to be applied to a modulation electrode in the optical waveguide element is disposed adjacent to the optical waveguide element.

7. An optical transmission apparatus comprising:
the optical device according to claim 6; and
a signal generator that generates a modulation signal to be input to the driver circuit element.

* * * * *